(12) United States Patent
Jansen et al.

(10) Patent No.: US 10,486,482 B2
(45) Date of Patent: Nov. 26, 2019

(54) AXLE UNIT

(71) Applicant: SAF-HOLLAND GmbH, Bessenbach (DE)

(72) Inventors: Roger Jansen, Holton, MI (US);
Gregory Galazin, Muskegon, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 170 days.

(21) Appl. No.: 15/510,097

(22) PCT Filed: Sep. 7, 2015

(86) PCT No.: PCT/EP2015/070336
§ 371 (c)(1),
(2) Date: Mar. 9, 2017

(87) PCT Pub. No.: WO2016/037961
PCT Pub. Date: Mar. 17, 2016

(65) Prior Publication Data
US 2017/0259638 A1    Sep. 14, 2017

(30) Foreign Application Priority Data
Sep. 12, 2014    (DE) .......................... 10 2014 218 317

(51) Int. Cl.
*B60G 9/02*    (2006.01)
*B60G 7/00*    (2006.01)
(Continued)

(52) U.S. Cl.
CPC ............ *B60G 9/025* (2013.01); *B60B 35/007* (2013.01); *B60B 35/02* (2013.01); *B60B 35/08* (2013.01);
(Continued)

(58) Field of Classification Search
CPC ........ B60G 9/025; B60G 3/145; B60G 7/001; B60G 7/008; B60G 2206/014;
(Continued)

(56) References Cited

U.S. PATENT DOCUMENTS 6,039,336 A     3/2000  Frey
2007/0145704 A1*  6/2007  Chan ..................... B60G 7/001
                                                  280/124.116
(Continued)

FOREIGN PATENT DOCUMENTS

CN    101242964    8/2008
CN    101272875    9/2008
(Continued)

OTHER PUBLICATIONS

European Patent Office; International Search Report, dated Oct. 29, 2015.

*Primary Examiner* — Darlene P Condra
(74) *Attorney, Agent, or Firm* — Price Heneveld LLP

(57) ABSTRACT

The invention relates to an axle unit comprising an axle tube and a link element, wherein the axle tube substantially extends along a tube axis, wherein the link element has a joining portion with a first welding portion and a second welding portion, wherein the link element is arranged with its joining portion adjacent to the axle tube and substantially transversely with respect to the tube axis, wherein, in the first welding portion and in the second welding portion, a welded joint can be produced between the link element and the axle tube.

21 Claims, 4 Drawing Sheets

(51) Int. Cl.
*B60B 35/00* (2006.01)
*B60B 35/08* (2006.01)
*B60B 35/02* (2006.01)
*B60G 3/14* (2006.01)

(52) U.S. Cl.
CPC ............ *B60G 3/145* (2013.01); *B60G 7/001* (2013.01); *B60G 7/008* (2013.01); *B60B 2310/302* (2013.01); *B60B 2900/711* (2013.01); *B60G 2200/22* (2013.01); *B60G 2200/31* (2013.01); *B60G 2204/148* (2013.01); *B60G 2206/012* (2013.01); *B60G 2206/014* (2013.01); *B60G 2206/11* (2013.01); *B60G 2206/16* (2013.01); *B60G 2206/8201* (2013.01); *B60G 2300/026* (2013.01)

(58) Field of Classification Search
CPC ........ B60G 2300/026; B60G 2204/148; B60G 2200/31; B60G 2200/22; B60G 2206/8201; B60G 2206/16; B60G 2206/11; B60G 2206/012; B60B 35/02; B60B 35/08; B60B 35/007; B60B 2310/302; B60B 2900/711
See application file for complete search history.

(56) References Cited

U.S. PATENT DOCUMENTS

| | | | |
|---|---|---|---|
| 2008/0029988 A1* | 2/2008 | Saieg | B60G 7/001 280/124.116 |
| 2009/0058029 A1* | 3/2009 | Drewes | B60G 9/003 280/124.1 |
| 2009/0072505 A1* | 3/2009 | McGinnis | B60G 9/003 280/124.116 |
| 2014/0015214 A1* | 1/2014 | Galazin | B60G 9/003 280/124.128 |

FOREIGN PATENT DOCUMENTS

| | | |
|---|---|---|
| CN | 103717418 | 4/2014 |
| DE | 69811741 | 10/2003 |
| DE | 60101803 | 11/2004 |
| DE | 102006009441 | 9/2007 |
| DE | 102006049390 | 4/2008 |
| DE | 102009003354 | 7/2010 |
| DE | 102013221545 | 4/2015 |
| WO | 2008115861 | 9/2008 |
| WO | 2009035520 | 3/2009 |

\* cited by examiner

AXLE UNIT

BACKGROUND OF THE INVENTION

The present invention relates to an axle unit in particular for use in commercial vehicles.

Axle units are known from the prior art insofar as an axle tube, which is frequently a rigid tube, is mounted or secured on the frame of the commercial vehicle in a sprung or damped manner via a link arrangement, wherein a vehicle wheel or a multiplicity of vehicle wheels is or are mounted rotatably in turn on the axle tube. The connecting region between axle tube and the longitudinal link here is a portion of the chassis suspension of the commercial vehicle that is particularly heavily loaded and in particular subject to periodic load changes, and there have been many attempts in the past to adapt the connecting region between longitudinal link and axle tube to said heavy loads. Many axle units have been known in this connection from the prior art, in which over-dimensioning and therefore a very high weight of the axle unit have had to be accepted as a consequence of designing the connecting region between axle unit and link unit to have greater security against fatigue fractures or similar damage. There is therefore a need for improvement in the region of the connection between the longitudinal link and the axle tube of a commercial vehicle wheel suspension in order in particular to reduce the weight of the axle unit and at the same time to permit sufficient strength values and simple production.

The object of the present invention is to provide an axle unit which can be produced simply and achieves particularly high strength values for the connecting region between an axle tube and a link element and also has a low component weight.

SUMMARY OF THE INVENTION

According to the invention, the axle unit comprises an axle tube and a link element, wherein the axle tube substantially extends along a tube axis, wherein the link element has a joining portion with a first welding portion and a second welding portion, wherein the link element is arranged with its joining portion adjacent to the axle tube and substantially transversely with respect to the tube axis, wherein, in the first welding portion and in the second welding portion, a welded joint can be produced between the link element and the axle tube. The axle tube is preferably an elongate body which extends substantially line-symmetrically, such as, for example, with polygonal cross section, or rotationally symmetrically about a tube axis. The axle tube is preferably formed in the manner of a hollow body. The link element is preferably the longitudinal link of a chassis suspension of a commercial vehicle or is part of such a link. The link element is oriented substantially transversely with respect to the main direction of extent, i.e. to the tube axis, with respect to the axle tube. The link element has a joining portion, which can be brought into engagement in an integrally bonded manner with a preferably corresponding outer geometry of the axle tube. For this purpose, the joining portion preferably has a first welding portion and a second welding portion, wherein, in the first welding portion and in the second welding portion, a welded joint can be produced, preferably is produced, in each case between the link element and the axle tube. Within the scope of the present invention, it has proven advantageous to provide the joining portion of the link element with two welding portions which are substantially spatially separated from each other, i.e. a first and a second welding portion, and therefore two weld seam regions which are preferably separated from each other and at which the link element can be secured, or preferably is secured, on the axle tube. By means of the spatial separation of the two welding portions, in particular a stress concentration in the region of the side seams can be avoided when the connection between link element and axle tube is loaded, and it is therefore possible to achieve a longer service life and also higher maximum forces which can be transmitted from the link element to the axle tube and vice versa. At the same time, it is possible with the present invention to optimize the profile or, in other words, the geometry of the first and of the second welding portion in such a manner that the welding portions are adapted to an optimum force flux between link element and axle tube. It is thus possible in particular to provide rounded side seam geometries in which the effect of the material hardening in the region of a side seam can be used in order to increase the strength of the connection between link element and joining portion and at the same time to avoid the risk of brittle fracture.

The link element preferably has an arm portion and a supporting portion, wherein the arm portion and the supporting portion are adjacent to the joining portion on substantially opposite sides of the joining portion. In addition to the joining portion, the link element preferably has an arm portion, wherein the arm portion is pivotably connected at a first distal end on the bearing bracket of a commercial vehicle chassis to the frame and at its second end is adjacent to the joining portion. Furthermore, a supporting portion is provided which preferably has a receiving region for the securing of a pneumatic spring. The link element can preferably be constructed here from individual modules, as a result of which use of one and the same assemblies of the link element for different commercial vehicle chassis is possible. The armed portion is particularly preferably formed integrally with the joining portion, wherein the supporting portion can be secured as a separate component on the joining portion and/or on the axle tube and has a corresponding joining region. The supporting portion is preferably secured here on the joining portion and/or along the axle tube after the arm portion and the axle tube have been joined together.

The first welding portion particularly preferably has two side seams extending at least in regions transversely with respect to a link axis, wherein the welding portion has at least one transverse seam extending substantially parallel to the link axis. The link axis here is preferably an axis along which or parallel to which the cross-sectional configuration of the joining portion changes only unsubstantially, if at all. The link axis is particularly preferably oriented parallel or collinearly to the tube axis, wherein the joining portion is preferably designed in such a manner that it has a geometry corresponding to the axle tube. The first welding portion preferably has two side seams which extend at least in some regions, particularly preferably, however, substantially transversely with respect to the link axis, and are therefore preferably arranged on the right and left of the link element and are in a welded joint with the axle tube. The transverse seam here is preferably a portion of the weld seam in the region of the first welding portion, said transverse seam extending substantially parallel to the link axis. In the present case, substantially parallel means that small deviations because of manufacturing tolerances and material unevennesses, which arise in particular during the application of a welded joint, are permissible within the scope of the present invention. Particularly preferably, the transition region between the side seams and the transverse seam is of rounded design, wherein the boundary between side seam and transverse seam is preferably defined in each case at the center of the rounded portion. That is to say, in other words, half of the rounded portion is assigned to the side seam and the respectively other half of the rounded portion is assigned to the transverse seam. Particularly preferably, the first welding portion comprises two side seams and two transverse seams and therefore a substantially continuous weld seam. The weld seam can be designed here as a continuous weld seam or preferably also as a sequence of individual weld points. The use of weld points is suitable in particular for automated welding processes. In a preferred embodiment in which the side seams extend substantially transversely with respect to the link axis, this feature is defined by the fact that the extent, that is to say the extension, of the side seam longitudinally or parallel to the link axis is preferably less than a quarter of the extent of the side seam transversely or preferably perpendicularly with respect to the link axis.

In the mounted state of the axle unit, the link axis is particularly preferably collinear to the tube axis. In other words, this means that, in the mounted state of the axle unit, preferably whenever the link element has been secured on the axle tube by means of welding, the corresponding geometry definitions which are based on the link axis of the link element, are also valid with respect to the tube axis. The link element preferably lies as extensively as possible against the axle tube at least in the regions of the side seams and of the transverse seam and in the region of the second welding portion. In other words, the joining portion with its inner geometry or with its geometry provided as a contact surface with the axle tube corresponds to the outer surface of the axle tube in the corresponding fastening region thereof on which the link element is secured.

In a particularly preferred embodiment, the side seams each have a side seam length which is in a ratio of 0.2 to 0.7, preferably 0.25 to 0.6 and particularly preferably of approx. 0.45 to 0.5 to the circumference of the axle tube in the region of the joining portion. The central circumference or the average value of various circumferential values of the outer surface of the axle tube over a region in which the axle tube is connected to the link element is preferably defined here as the circumference of the axle tube in the region of the joining portion. It goes without saying that the circumference of the axle tube or the central circumference of the axle tube both in the case of polygonal outer geometries and in the case of a cylindrical outer geometry of the axle tube is in each case measured perpendicularly to the tube axis. The absolute length amount of the side seam in the region of the side seams is preferably defined here as the side seam length. The side seam can preferably be of corrugated design here or can have another geometry differing from a simply curved shape. The ratio of the side seam length to the circumference of the axle tube is, in other words, an expression for the length, along which the link element is welded to the axle tube, in relation to the thickness of the axle tube. Preferably, half of the possibly provided, rounded portions between the side seam and a transverse seam are assigned here to the side seam. The ratio of 0.2 to 0.7, at its lower limit of 0.2, still just permits a sufficient side seam length between link element and axle tube and, on the other hand, in the region of its maximum value of 0.7, permits a, for example, meandering shape of the side seam, as a result of which the side seam length can be significantly increased in relation to the circumference of the axle tube and in particular the transmission of force or transmission of a bending moment between axle tube and link element can be optimized toward lower material stresses. Within the preferred range of 0.25 to 0.6, it has been shown that in particular axle units for use in normal tractors and their trailers, for example a 40 ton road train, the ratio of side seam length to circumference of the axle tube still produces sufficient clearance for a slightly corrugated geometry of the side seam and, on the other hand, the side seam length is still large enough to provide a sufficient strength even for more heavily loaded commercial vehicle chassis. The particularly preferred ratio of 0.45 to 0.5 has proven successful here in particular for use in highly loaded commercial vehicles since preferably substantially half of the circumference of the axle tube is brought into connection with the link element, as a result of which sufficiently high strengths for transmitting the forces and bending moments which occur and also the torsional moments sometimes occurring at the axle tube during braking operations are provided even for heavily loaded chassis systems of heavy commercial vehicles.

In a particularly preferred embodiment, the side seams or the first welding portion each extend over an arc angle with respect to the link axis, wherein the arc angle is 120° to 195°, preferably 140° to 185° and particularly preferably approx. 170° to 180°. In addition to the ratio of the side seam length to the circumference of the axle tube, the extent of the side seams or of the first welding portion over an arc angle with respect to the link axis or the tube axis, which is preferably oriented collinearly to the link axis, is an expression for the surrounding of the axle tube by the joining portion of the link element. It is particularly preferred here for the link element to surround the axle tube in such a manner that said link element can be brought up laterally, i.e. transversely with respect to the tube axis, to the axle tube and to subsequently be connected to axle tube. Within the context of the present invention, the minimum value of the arc angle of 120° is preferably not fallen short of in order to provide a sufficient fastening length to weld the link element to the axle tube. With the joining portion being slightly bent upward, the maximum value of the arc angle of 195° permits the axle tube nevertheless to be able to be inserted into the joining portion transversely with respect to the link axis and subsequently to be able to be welded. It goes without saying that, without the use of force, the axle tube could only be joined into the joining portion along the link axis. The particularly preferred range of 140° to 185° permits, firstly, a high strength of the connection between link element and axle tube and, secondly, with application of a slight bending force and therefore a slight expansion of the joining portion, the axle tube to be able to be inserted into the joining portion laterally or transversely with respect to the link axis. The particularly preferred range of 170° to 180° of the arc angle permits, firstly, a particularly high strength of the connection between axle tube and link element because of the optimized length of the side seams and, secondly, the link element and the axle tube to be joined together in the region of the joining portion without the necessity of installation forces.

The arc angle particularly preferably does not exceed the value of 180°. In this preferred embodiment, the link element can be placed onto the axle without the use of force. Costs for the manufacturing of an axle unit can thereby be reduced since no additional appliance whatsoever apart from a welding appliance is necessary.

The side seams and the transverse seam preferably merge into one another in rounded weld seam portions. The transition region between the side seams and the transverse seam is particularly preferably of rounded design, wherein the limit between side seam and transverse seam is preferably defined in each case at the center of the rounded portion.

That is to say, in other words, half of the rounded portion is assigned to the side seam and the respectively other half of the rounded portion is assigned to the transverse seam. Particularly preferably, the first weld portion comprises two side seams and two transverse seams and therefore a substantially continuous weld seam.

In a particularly preferred embodiment, the sum of the lengths of the side seams and of the transverse seams results in a joining length of the first welding portion, wherein the joining length is in a ratio of 1 to 2.5, preferably of 1.25 to 2 and particularly preferably of approx. 1.5 to the circumference of the axle tube in the region of the joining portion. In other words, the joining length is therefore the length of the entire weld seam which is produced in the first welding portion between the link element and the axle tube. The joining length here is preferably at least as large as the circumference of the axle tube in the region of its connection to the link element. The preferred range of 1 to 2.5 of the joining length to the circumference permits the formation here of a particularly firm connection between the link element and the axle tube, wherein a higher weight has to be accepted, however, because of the greater width of the link element. With the particularly preferred ratio of 1.25 to 2, sufficient strength values can be achieved for all customary commercial vehicle chassis, wherein, with a maximum value of the ratio of 2, the weight of the axle unit can be kept substantially lower than in the design with a ratio of 2.5. Within the context of the present invention, the particularly preferred range of the ratio of 1.5 has produced a particularly high strength of the connection between link element and axle tube with a comparatively very low weight in comparison to all other tested variants of the axle unit.

The second welding portion is preferably designed as a recess on the link element, wherein the second welding portion has an encircling edge on which a weld seam can be produced. The second welding portion is therefore preferably provided as an eye-shaped recess on the link element and is preferably arranged centrally between the upper regions of the side seams of the first welding portion. The upper side is preferably defined as that side of the joining portion which lies opposite the arc angle of the first welding portion. Via the second welding portion, additionally to the first welding portion, it is possible to produce a further side seam between the link element and the axle tube, as a result of which the distribution of force between axle tube and link element is improved overall. The encircling edge of the second welding portion preferably has a bevel which facilitates the production of a side seam and therefore accelerates the manufacturing of the axle unit and reduces the costs thereof.

Particularly preferably, the encircling edge has an edge length which is in a ratio of 0.4 to 1.3, preferably 0.6 to 1 and particularly preferably of approx. 0.85 to 0.95 to the circumference of the axle tube in the region of the joining portion. Similarly to the explanations with regard to the first welding portion, the encircling edge of the second welding portion and the edge length of said edge is also a possibility of influencing the actual connecting length, i.e., in other words, the length along which a weld seam is produced between the axle tube and the link element. It has been shown here that, within the scope of a ratio of 0.4 to 1.3, a favorable compromise is provided between a remaining residual wall thickness of the link unit outside the second welding portion and an, on the other hand, sufficient great connecting length or welding edge length between link element and axle tube. The preferred ratio of 0.6 to 1 makes it possible here that, in the case of a preferred, slightly elliptical design of the second welding portion, an edge length of the encircling edge is achieved which is substantially greater than or equal to the circumference of the axle tube, as a result of which, when designing the axle unit, preferably scaling merely has to be undertaken and the correspondingly advantageous ratio between the edge length of the second welding portion and the thickness or the circumference of the axle tube can always be selected.

Furthermore preferably, the second welding portion is provided on the link element in such a manner that two link webs are formed adjacent to the second welding portion and opposite each other, wherein the link webs have a minimum web width, wherein the second welding portion has a section extent collinearly to the minimum web widths, wherein the sum of the minimum web widths to the section extent is in a ratio of 0.1 to 1, preferably 0.2 to 0.8 and particularly preferably of approx. 0.3 to 0.4. The web regions adjacent to the second welding portion preferably have a greater extent transversely with respect to the link axis or to the tube axis than their web width. By this means, the web portions constitute a preferred material reinforcement of the link element in the region of the second welding portion, said material reinforcement compensating for the material weakening caused by the recess of the second welding portion. In order to achieve a good compromise between sufficient material thickness of the link element and a simultaneously sufficient edge length along which the second welding portion can be secured on the axle tube, it is preferred that the section extent is in a certain ratio to the extent of the web width. The link webs preferably have a web width, the minimum value of which is smaller than the extent of the second welding portion along or parallel to the link axis or the tube axis. The preferred ratio range of 0.1-1 of the sum of the minimum web widths to the section extent ensures a particularly good compromise here between a sufficient edge length for welding the link element to the axle tube and a continuing sufficient strength of the link element against deformation. A particularly good compromise can thereby be found between the strength of the welded joint between link element and axle tube and the strength of the link element itself. The particularly preferred range of 0.2-0.8 has proven successful here in particular for axle systems in which a particularly compact construction of the link element/axle tube connection is required. According to the applicants tests, the particularly preferred ratio range of 0.3-0.4 achieved the best values for the strength of the link element, on the one hand, and the strength of the welded joint between link element and axle tube, on the other hand.

The link element is preferably designed as an integral cast part. In this preferred embodiment, the arm portion and the joining portion and the supporting portion of the link element are produced integrally by means of a joint casting process. Casting processes are preferred in particular because of their small production time and the few working steps required for producing the link element since time and costs can thereby be reduced.

In an alternatively preferred embodiment, the arm portion and the supporting portion are produced as separate components, wherein the arm portion or the supporting portion is secured to the joining portion by means of welding. In other words, this means that the joining portion is either formed integrally on the arm portion or integrally on the supporting portion, and the respectively other portion is correspondingly welded to the joining portion. The advantage of this embodiment is that a semi-finished product consisting, for example, of arm portion and joining portion can be used universally, and supporting portions of various size or various shape can be secured to one and the same assembly consisting of arm portion and joining portion, as a result of which versatile use of the axle units provided within the meaning of this invention is possible. Alternatively preferably, the arm portion can also be formed independently of the joining portion and supporting portion, and therefore, for example, different link lengths, which are preferably measured transversely with respect to the link axis, can be provided for one and the same connection of joining portion and supporting portion.

Particularly preferably, the connection between axle tube and link element is first of all produced in the first welding portion and subsequently in the second welding portion. By means of this preferred production sequence, the material stresses occurring in the connecting region between link element and axle tube because of the distortion following the cooling of the weld seams can be minimized.

BRIEF DESCRIPTION OF THE DRAWINGS

Further advantages and features of the invention emerge from the description below with respect to the attached figures, in which.

DETAILED DESCRIPTION OF THE PREFERRED EMBODIMENTS

Figure 1:
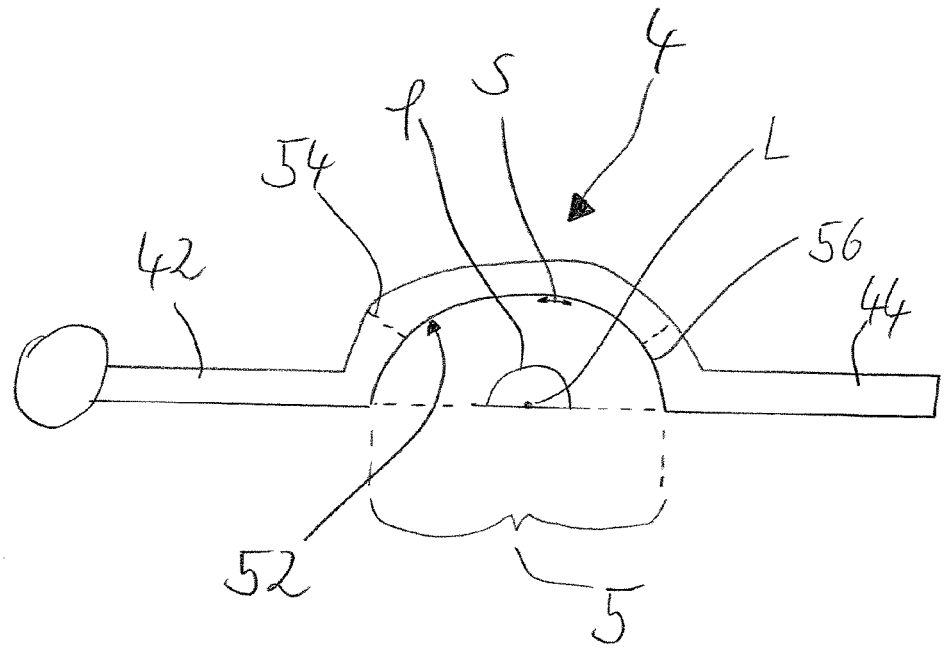
FIG. 1 shows a side view of a preferred embodiment of the axle unit according to the invention.

FIG. 1 shows a side view of a preferred embodiment of the link element 4 according to the invention which, on its left side, has an arm portion 42, a joining portion 5 adjacent to the latter and a supporting portion 44 adjacent in turn to the joining portion. Illustrated schematically on the left of the arm portion 42 is a bearing eye at which the link element 4 can be connected pivotably to the frame of a vehicle, in particular commercial vehicle. The joining portion 5 of the link element 4 preferably has a first welding portion 52 which preferably has a side seam 56. It cannot be seen in the figure that a second side seam 56 is provided on that side of the link element 4 which faces away from the observer. The link element 4 is welded to an axle tube 2 (not shown) at the side seam 56. In the embodiment shown in FIG. 1, the side seam 56 extends here with respect to a link axis with an arc angle φ which, in the present example, is slightly larger than 180°. Furthermore, the side seam 56 has a side seam length S. The link axis is preferably oriented here parallel to the direction of observation in the figure, and it is particularly preferred that the cross section of the link element 4 changes only slightly if at all in the region of the joining portion 5 over the course along the link axis L. The link element 4 shown in FIG. 1 is designed in particular for connection to an axle tube 2 of cylindrical or hollow-cylindrical design. Particularly preferably, the axle tube 2 can be fitted here into the joining portion 5 of the link element 4 transversely with respect to the link axis L and can be subsequently welded to the link element 4 along the side edge 56. A second welding portion 54 of the joining portion 5, which welding portion is designed as a recess on the upper side of the link element 4, is illustrated by dashed lines.

Figure 2:
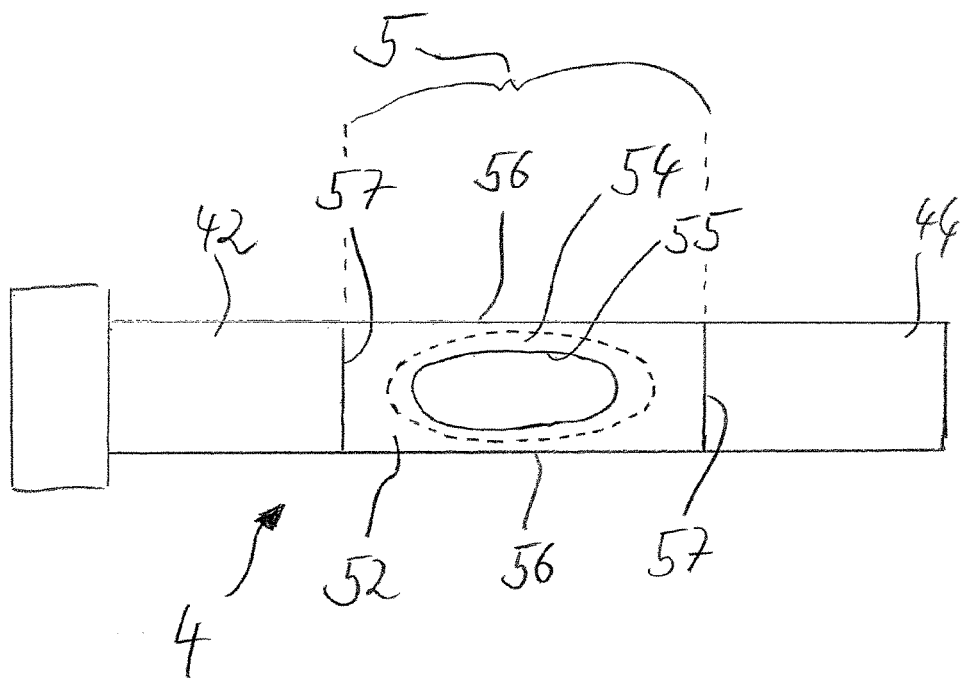
FIG. 2 shows a top view of the view shown in FIG. 1 of a preferred embodiment of the axle unit according to the invention.

FIG. 2 shows the underside of the embodiment shown in FIG. 1 of the link element 4. The joining portion 5 here has the first welding portion 52 and the second welding portion 54. The first welding portion 52 has two side seams 56 and two transverse seams 57. The second welding portion 54 has an encircling edge 55 along which a welding connection can be produced to the axle tube 2 (not shown).

Figure 3:
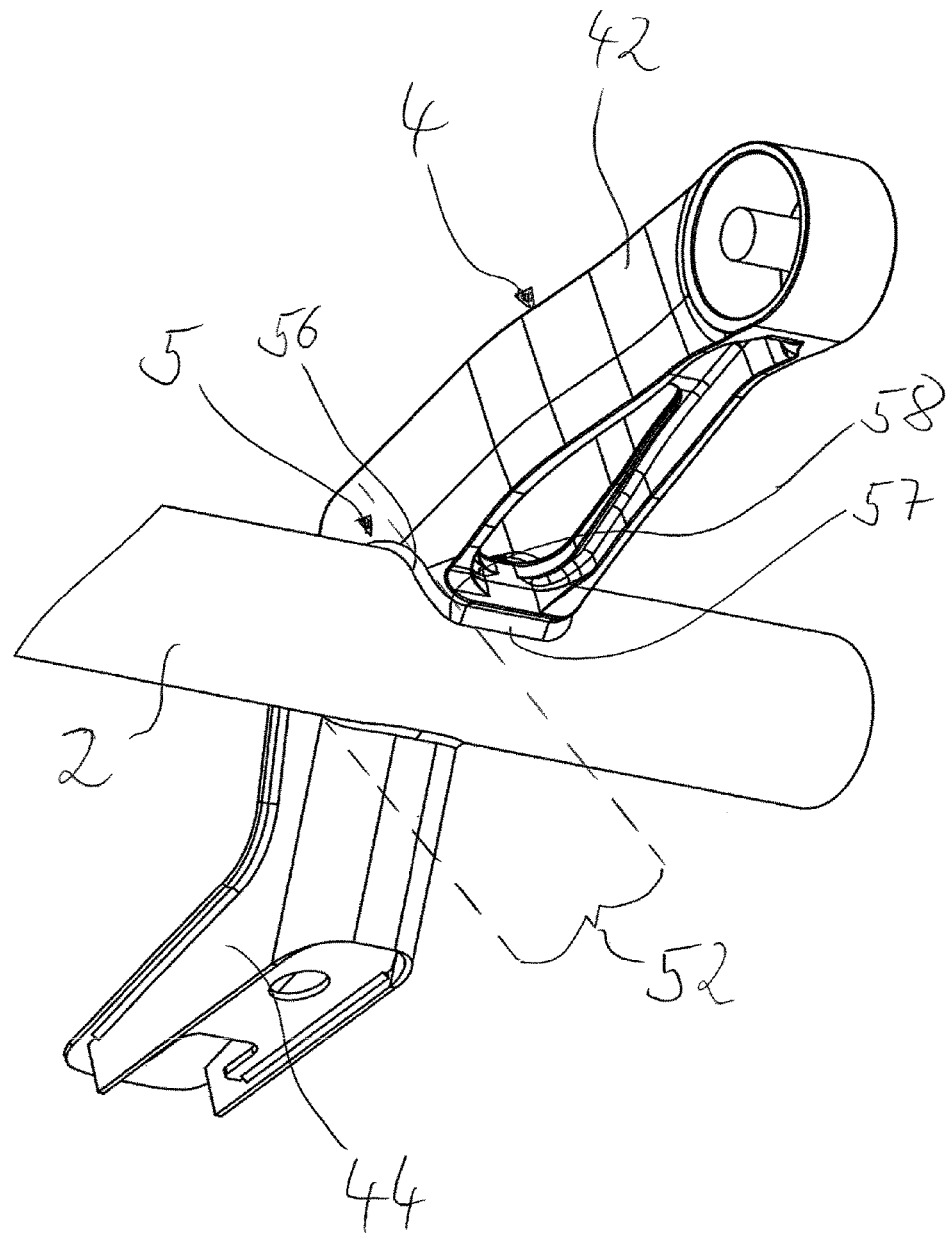
FIG. 3 shows a perspective view of a preferred embodiment of the axle unit according to the invention.

The perspective view in FIG. 3 illustrates the connecting region between the link element 4 and the axle tube 2. The joining portion 5 is shown here from its underside, wherein in particular the first welding portion 52 can be seen. The first welding portion 52 has a side seam 56 and a transverse seam 57. The side seam 56 and the transverse seam 57 are connected to each other here in their lower region via a rounded weld seam portion 58.

Figure 4:
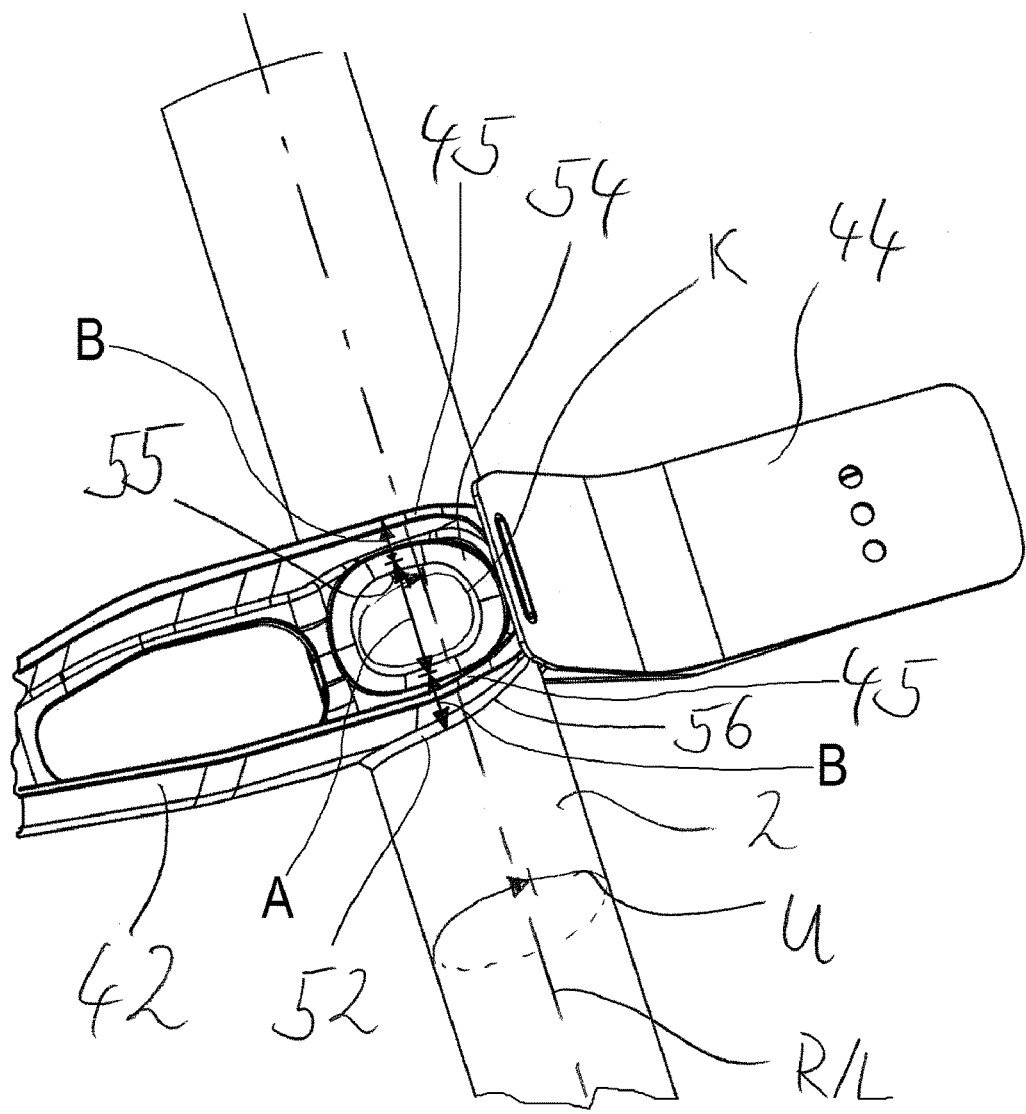
FIG. 4 shows a further view of the embodiment shown in FIG. 3 of the axle unit according to the invention.

FIG. 4 shows a top view of the embodiment already shown in FIG. 3 of the axle unit according to the invention. In particular the second welding portion 54 which has an encircling edge 55 can be clearly seen here. As illustrated schematically, the encircling edge has an edge length K. Furthermore, the circumference of the axle tube 2 is illustrated, said circumference preferably being measured at the outer surface of the axle tube 2 perpendicularly to the tube axis R. Furthermore, FIG. 4 shows the preferred feature of the axle unit, according to which the link element 4 has a first link web 45 and a second link web 45 in the joining portion 5. The link webs 45 here have a minimum web width B, wherein at the same time the second welding portion 54 has, collinearly to the direction of extent of the web width B, a section extent A which is at a certain ratio to the sum of the web widths B. The web width B is preferably measured here in each case half way along the respective transition region of the link webs 45 to the adjacent regions of the link element 4. The web widths B are preferably smaller than the section extent A. In the present example, the sum of the two web widths B is approximately 0.6-0.8 times the section extent A. Furthermore, the preferred slightly elliptical shape of the second welding portion 54 is visible in FIG. 4.

Figure 5:
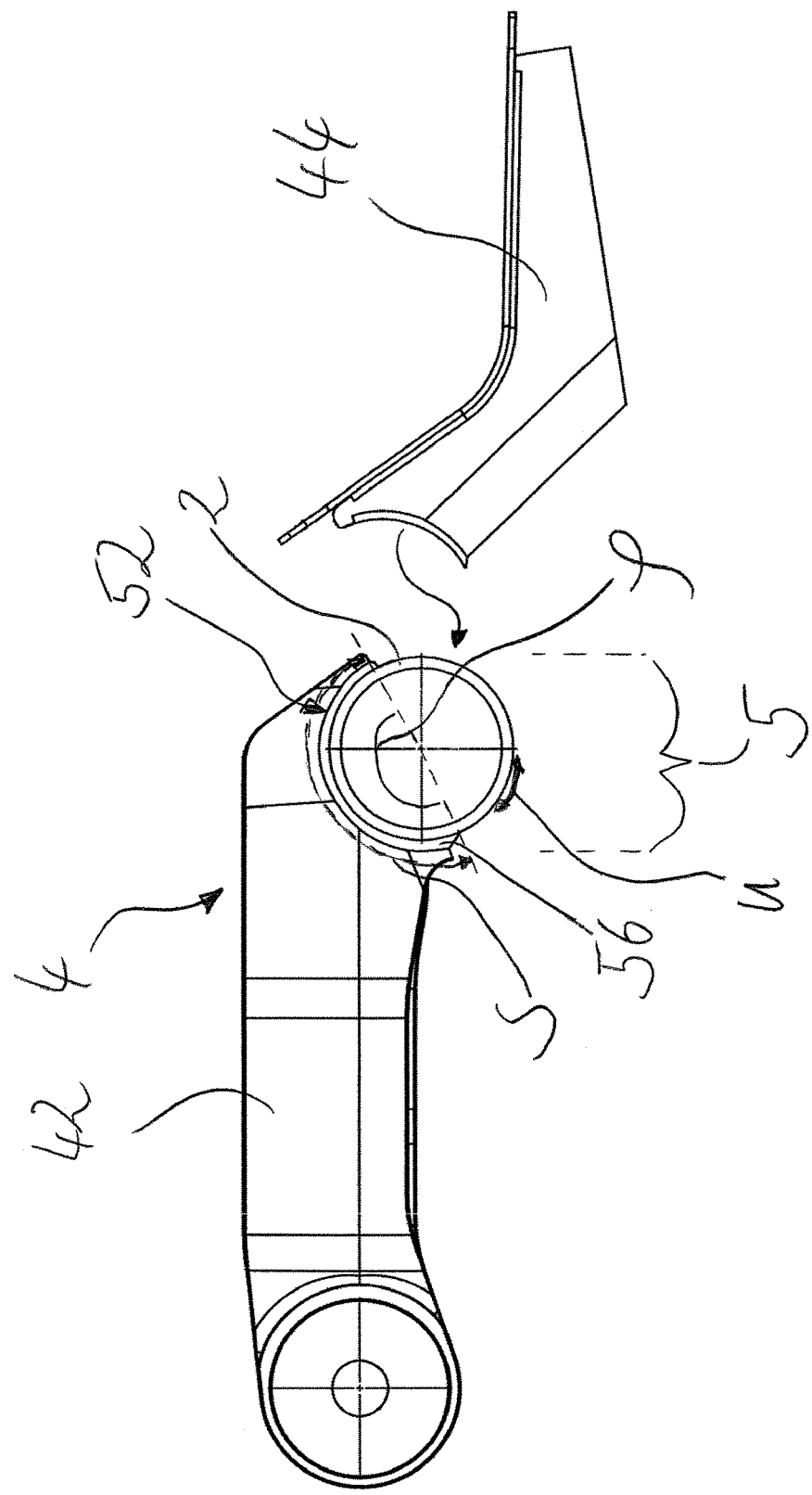
FIG. 5 shows a further preferred embodiment of the axle unit according to the invention.

FIG. 5 shows a particularly preferred embodiment of the axle unit, in which the joining portion 5 is formed integrally with the arm portion 42, and the supporting portion 44 is designed as a separate component and can be secured to the joining portion 5 and/or to the axle tube 2. The first welding portion 52 extends here with an arc angle φ of somewhat less than 180°, preferably 170° to 175°. By this means, it is possible in a particularly simple manner to arrange the axle tube 2 in the joining portion 5 and subsequently to secure the axle tube with a thermal welding process. Advantageously in this embodiment, first of all a semi-finished product consisting of axle tube 2, joining portion 5 and arm portion 42 can be produced, wherein a supporting portion 44 can subsequently be secured to the semi-finished product. In order to permit use of the link element 4 in various types of commercial vehicle, it is preferred that, depending on the application, a supporting portion 44 with a certain length and a certain fastening geometry for a pneumatic spring is selected and is secured to the assembly consisting of axle tube 2, joining portion 5 and arm portion 42.

DESIGNATIONS

2—axle tube
4—link element

42—arm portion
44—supporting portion
45—link web
5—joining portion
52—first welding portion
54—second welding portion
55—encircling edge
56—side seam
57—transverse seam
58—rounded weld seam portion
A—section extent
B—minimum web width
K—edge length
L—link axis
φ—arc angle
R—tube axis
S—side seam length
U—circumference

The invention claimed is:

1. An axle unit, comprising:
an axle tube substantially extending along a tube axis;
a link element having a joining portion with a first welding portion and a second welding portion spatially separated from the first welding portion, wherein the link element is arranged with the joining portion adjacent to the axle tube and substantially transversely with respect to the tube axis; and
a welded joint between the link element and the axle tube in the first welding portion and in the second welding portion;
wherein the second welding portion includes a recess on the link unit, and wherein the second welding portion has an encircling edge that receives a weld seam;
wherein the first welding portion has two side seams extending at least in regions transversely with respect to a link axis, and wherein the first welding portion has at least one transverse seam extending substantially parallel to the link axis; and
wherein the side seams each have a side seam length, and wherein a ratio of the side seam length to a circumference of the axle tube in a region of the joining portion is from 0.2 to 0.7.

2. The axle unit as claimed in claim 1, wherein the link element has an arm portion and a supporting portion, wherein the arm portion and the supporting portion are adjacent to the joining portion on substantially opposite sides of the joining portion.

3. The axle unit as claimed in claim 2, wherein the arm portion and supporting portion are separate components, and wherein the arm portion is integral with the joining portion.

4. The axle unit from claim 1, wherein the ratio of the side seam length to the circumference of the axle tube is from 0.25 to 0.6.

5. The axle unit from claim 4, wherein the ratio of the side seam length to the circumference of the axle tube is from 0.45 to 0.5.

6. The axle unit as claimed in claim 1, wherein the link element comprises an integral cast part.

7. The axle unit as claimed in claim 1, wherein the connection between axle tube and link element is first produced in the first welding portion and subsequently produced in the second welding portion.

8. An axle unit, comprising:
an axle tube substantially extending along a tube axis;
a link element having a joining portion with a first welding portion and a second welding portion spatially separated from the first welding portion, wherein the link element is arranged with the joining portion adjacent to the axle tube and substantially transversely with respect to the tube axis; and
a welded joint between the link element and the axle tube in the first welding portion and in the second welding portion;
wherein the second welding portion includes a recess on the link unit, and wherein the second welding portion has an encircling edge that receives a weld seam;
wherein the first welding portion has two side seams extending at least in regions transversely with respect to a link axis, and wherein the first welding portion has at least one transverse seam extending substantially parallel to the link axis; and
wherein at least one of the side seams and the first welding portion extend over an arc angle with respect to the link axis, and wherein the arc angle is from 120° to 195°.

9. The axle unit of claim 8, wherein the arc angle is from 140° to 185°.

10. The axle unit of claim 9, wherein the arc angle is from 170° to 180°.

11. The axle unit as claimed in claim 8, wherein the arc angle does not exceed 180°.

12. An axle unit, comprising:
an axle tube substantially extending along a tube axis;
a link element having a joining portion with a first welding portion and a second welding portion spatially separated from the first welding portion, wherein the link element is arranged with the joining portion adjacent to the axle tube and substantially transversely with respect to the tube axis; and
a welded joint between the link element and the axle tube in the first welding portion and in the second welding portion;
wherein the second welding portion includes a recess on the link unit, and wherein the second welding portion has an encircling edge that receives a weld seam;
wherein the first welding portion has two side seams extending at least in regions transversely with respect to a link axis, and wherein the first welding portion has at least one transverse seam extending substantially parallel to the link axis; and wherein the side seams and the transverse seam merge into one another in rounded weld seam portions.

13. An axle unit, comprising:
an axle tube substantially extending along a tube axis;
a link element having a joining portion with a first welding portion and a second welding portion spatially separated from the first welding portion, wherein the link element is arranged with the joining portion adjacent to the axle tube and substantially transversely with respect to the tube axis; and
a welded joint between the link element and the axle tube in the first welding portion and in the second welding portion;
wherein the second welding portion includes a recess on the link unit, and wherein the second welding portion has an encircling edge that receives a weld seam;
wherein the first welding portion has two side seams extending at least in regions transversely with respect to a link axis, and wherein the first welding portion has at least one transverse seam extending substantially parallel to the link axis; and
wherein the sum of the side seam lengths of the side seam and of the transverse seams results in a joining length of the first welding portion, wherein a ratio of the joining length to a circumference of the axle tube in a region of the joining portion is from 1 to 2.5.

14. The axle unit of claim 13, wherein the ratio of the joining length to the circumference of the axle tube is from 1.25 to 2.

15. The axle unit of claim 14, wherein the ratio of the joining length to the circumference of the axle tube is approximately 1.5.

16. An axle unit, comprising:
an axle tube substantially extending along a tube axis;
a link element having a joining portion with a first welding portion and a second welding portion spatially separated from the first welding portion, wherein the link element is arranged with the joining portion adjacent to the axle tube and substantially transversely with respect to the tube axis; and
a welded joint between the link element and the axle tube in the first welding portion and in the second welding portion;
wherein the second welding portion includes a recess on the link unit, and wherein the second welding portion has an encircling edge that receives a weld seam; and
wherein the encircling edge has an edge length, and wherein a ratio of the edge length to a circumference of the axle tube in a region of the joining portion is from 0.4 to 1.3.

17. The axle unit of claim 16, wherein the ratio of the edge length to the circumference of the axle tube is from 0.06 to 1.

18. The axle unit of claim 17, wherein the ratio of the edge length to the circumference of the axle tube is from 0.85 to 0.95.

19. An axle unit, comprising:
an axle tube substantially extending along a tube axis;
a link element having a joining portion with a first welding portion and a second welding portion spatially separated from the first welding portion, wherein the link element is arranged with the joining portion adjacent to the axle tube and substantially transversely with respect to the tube axis; and
a welded joint between the link element and the axle tube in the first welding portion and in the second welding portion;
wherein the second welding portion includes a recess on the link unit, and wherein the second welding portion has an encircling edge that receives a weld seam; and wherein the second welding portion is configured on the link element such that two link webs are located adjacent to the second welding portion and opposite each other, wherein the link webs have a minimum web width, wherein the second welding portion has a section extent collinearly to the minimum web widths, and wherein a ratio of the sum of the minimum web widths to the section extent is from 0.1 to 1.

20. The axle unit of claim 19, wherein the ratio of the sum of the minimum in web widths to the section extent is from 0.2 to 0.8.

21. The axle unit of claim 20, wherein the ratio of the sum of the minimum in web widths to the section extent is from 0.3 to 0.4.

* * * * *